US012776436B2

(12) United States Patent
Kato et al.

(10) Patent No.: US 12,776,436 B2
(45) Date of Patent: Oct. 27, 2026

(54) TRANSFORMER DEVICE PROVIDED WITH TWO CORES AND COOLING DEVICE FOR AVOIDING CORE CRACKING

(71) Applicant: Panasonic Intellectual Property Management Co., Ltd., Osaka (JP)

(72) Inventors: Akira Kato, Osaka (JP); Takehiko Yamakawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 739 days.

(21) Appl. No.: 18/268,126

(22) PCT Filed: Dec. 24, 2021

(86) PCT No.: PCT/JP2021/048328

§ 371 (c)(1),
(2) Date: Jun. 16, 2023

(87) PCT Pub. No.: WO2022/145390

PCT Pub. Date: Jul. 7, 2022

(65) Prior Publication Data

US 2024/0071678 A1 Feb. 29, 2024

(30) Foreign Application Priority Data

Dec. 28, 2020 (JP) ................................ 2020-218973

(51) Int. Cl.

*H02J 50/10* (2016.01)
*H01F 27/08* (2006.01)
*H01F 27/26* (2006.01)

(52) U.S. Cl.

CPC .......... *H01F 27/263* (2013.01); *H01F 27/08* (2013.01); *H02J 50/10* (2016.02)

(58) Field of Classification Search

CPC ......... H02J 50/10; H01F 27/08; H01F 27/263
See application file for complete search history.

(56) References Cited

U.S. PATENT DOCUMENTS

2012/0062350 A1 3/2012 Moiseev
2019/0006078 A1 1/2019 Sakai et al.
2023/0028214 A1 1/2023 Yamakawa et al.

FOREIGN PATENT DOCUMENTS

JP 2010-098207 * 4/2010
JP 2010-098207 A 4/2010

(Continued)

OTHER PUBLICATIONS

Decision of Refusal dated Jan. 6, 2026 issued in the corresponding Japanese Patent Application No. 2022-573067, with English translation.

(Continued)

*Primary Examiner* — Robert Grant
(74) *Attorney, Agent, or Firm* — Rimon P.C.

(57) ABSTRACT

A transformer device according to the disclosure includes a transformer and a cooling device that cools the transformer. The transformer includes a primary coil, a secondary coil, and a first core and a second core, into which the primary and secondary coils are respectively inserted. The first and second cores are disposed to face each other. The first core includes a first core part and a second core part, each of the first and second core parts formed by dividing the first core in a predetermined division plane. The first and second core parts of the first core are disposed to face each other through a gap, and in which the first core and the cooling device are disposed to face each other.

12 Claims, 7 Drawing Sheets

(56) References Cited

FOREIGN PATENT DOCUMENTS

| | | | |
|---|---|---|---|
| JP | 2011-253877 | A | 12/2011 |
| JP | 2012-059942 | A | 3/2012 |
| JP | 2013-131540 | A | 7/2013 |
| JP | 2015-103538 | A | 6/2015 |
| JP | 5974833 | B2 | 8/2016 |
| JP | 2017-168564 | A | 9/2017 |
| WO | 2021/117811 | A1 | 6/2021 |

OTHER PUBLICATIONS

Notice of Reasons for Refusal issued in corresponding Japanese Patent Application No. 2022-573067, dated Oct. 7, 2025.

International Preliminary Report on Patentability dated Jul. 13, 2023 issued in International Patent Application No. PCT/JP2021/048328, with English translation.

International Search Report dated Mar. 22, 2022 issued in International Patent Application No. PCT/JP2021/048328, with English translation.

* cited by examiner

206

TRANSFORMER DEVICE PROVIDED WITH TWO CORES AND COOLING DEVICE FOR AVOIDING CORE CRACKING

CROSS-REFERENCE OF RELATED APPLICATIONS

This application is the U.S. National Phase under 35 U.S.C. § 371 of International Patent Application No. PCT/JP2021/048328, filed on Dec. 24, 2021, which in turn claims the benefit of Japanese Patent Application No. 2020-218973, filed on Dec. 28, 2020, the entire disclosures of which Applications are incorporated by reference herein.

TECHNICAL FIELD

The present disclosure relates to a transformer device used in an electric power converting device that is, for example, a DC-DC converter.

BACKGROUND ART

An on-board charger to charge a rechargeable battery from a commercial AC power source has traditionally been mounted in an electric vehicle or a plug-in hybrid vehicle. The on-board charger is disclosed in each of, for example, Patent Document 1 and Patent Document 2. Patent Document 1 discloses a transformer that has E-shaped cores combined therein with each other. Patent Document 2 discloses a shell-type transformer which is formed by separating an inner leg at the center thereof and in which a heat dissipating plate is intervened therebetween. Patent Document 3 discloses a transformer capable of highly efficiently dissipate the heat of cores thereof.

PRIOR ART DOCUMENTS

Patent Documents

Patent Document 1: JP 2013-131540 A
Patent Document 2: JP 5974833 B2
Patent Document 3: JP 2015-103538 A

SUMMARY OF INVENTION

Problems to be Solved by Invention

With the transformers of Patent Documents 1 and 2, a problem arises that core cracking occurs due to temperature variation. With the transformer of Patent Document 3, a problem arises that manufacture of a transformer having a desired leakage inductance is difficult due to dispersion in the manufacture.

An object of the present disclosure is to provide a transformer device that has a desired leakage inductance and that can avoid core cracking even in the case where temperature variation occurs.

Means for Solving Problems

A transformer device according to the present disclosure includes a transformer and a cooling device that cools the transformer. The transformer includes a primary coil, a secondary coil, and a first core and a second core, into which the primary and secondary coils are respectively inserted. The first and second cores are disposed to face each other. The first core includes a first core part and a second core part, each of the first and second core parts formed by dividing the first core in a predetermined division plane. The first and second core parts of the first core are disposed to face each other through a gap. The first core and the cooling device are disposed to face each other.

Effect of Invention

According to the transformer device of the present disclosure, the transformer device has a desired leakage inductance and can avoid any core cracking therein even in the case where temperature variation occurs, and the reliability of the transformer device can be enhanced.

DETAILED DESCRIPTION OF INVENTION

Figure 1:
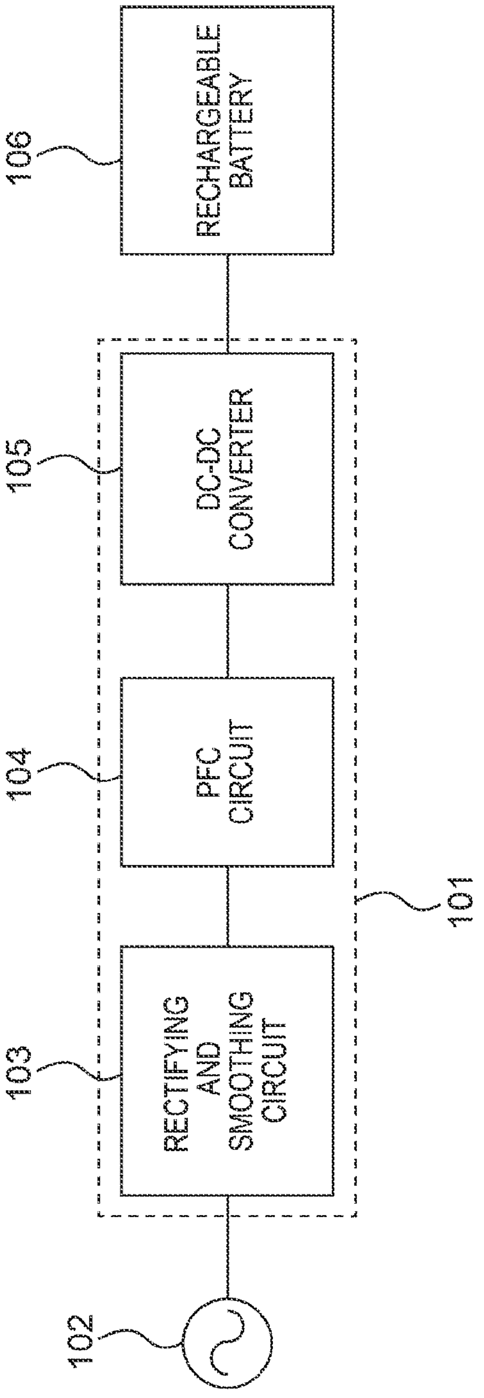
FIG. 1 is a block diagram illustrating an example of the configuration of an on-board charger 101 according to an embodiment of the present disclosure.

Embodiments according to the present disclosure will be described below with reference to the drawings. Configurations described below are however only one example of the present disclosure, the present disclosure is not limited to the following embodiment, and various changes can be made to even those other than the embodiment depending on the design and the like, within the scope not departing from the technical idea according to the present disclosure. In the following embodiments, similar constituent elements are denoted by the same reference numeral.

Embodiment

FIG. 1 is a block diagram illustrating an example of the configuration of an on-board charger 101 according to an embodiment of the present disclosure. The on-board charger 101 in FIG. 1 is characterized in that, the on-board charger 101 converts AC electric power from a commercial AC power source 102 into DC electric power, and outputs the DC electric power to a rechargeable battery 106, and a transformer 206 incorporated in a DC-DC converter 105 insulates the electric power before the conversion and that after the conversion from each other. The on-board charger 101 is one example of a charger or a power source device, and the rechargeable battery 106 is one example of a load or the like.

In FIG. 1, the on-board charger 101 includes a rectifying and smoothing circuit 103, a power factor correction circuit (PFC circuit) 104, and the DC-DC converter 105. In an electric vehicle or a plug-in hybrid vehicle, the AC electric power from the commercial AC power source 102 at 100 V or 200 V is rectified and smoothed by the rectifying and smoothing circuit 103. Then, the PFC circuit 104 executes power factor correction for the rectified and smoothed voltage input to the PFC circuit and outputs the power-factor corrected voltage to the DC-DC converter 105. The DC-DC converter 105 executes voltage conversion for the DC voltage input to the DC-DC converter such that the input DC voltage is converted into a DC output voltage that depends on the battery voltage of the rechargeable battery 106 in the subsequent stage thereof.

Figure 2:
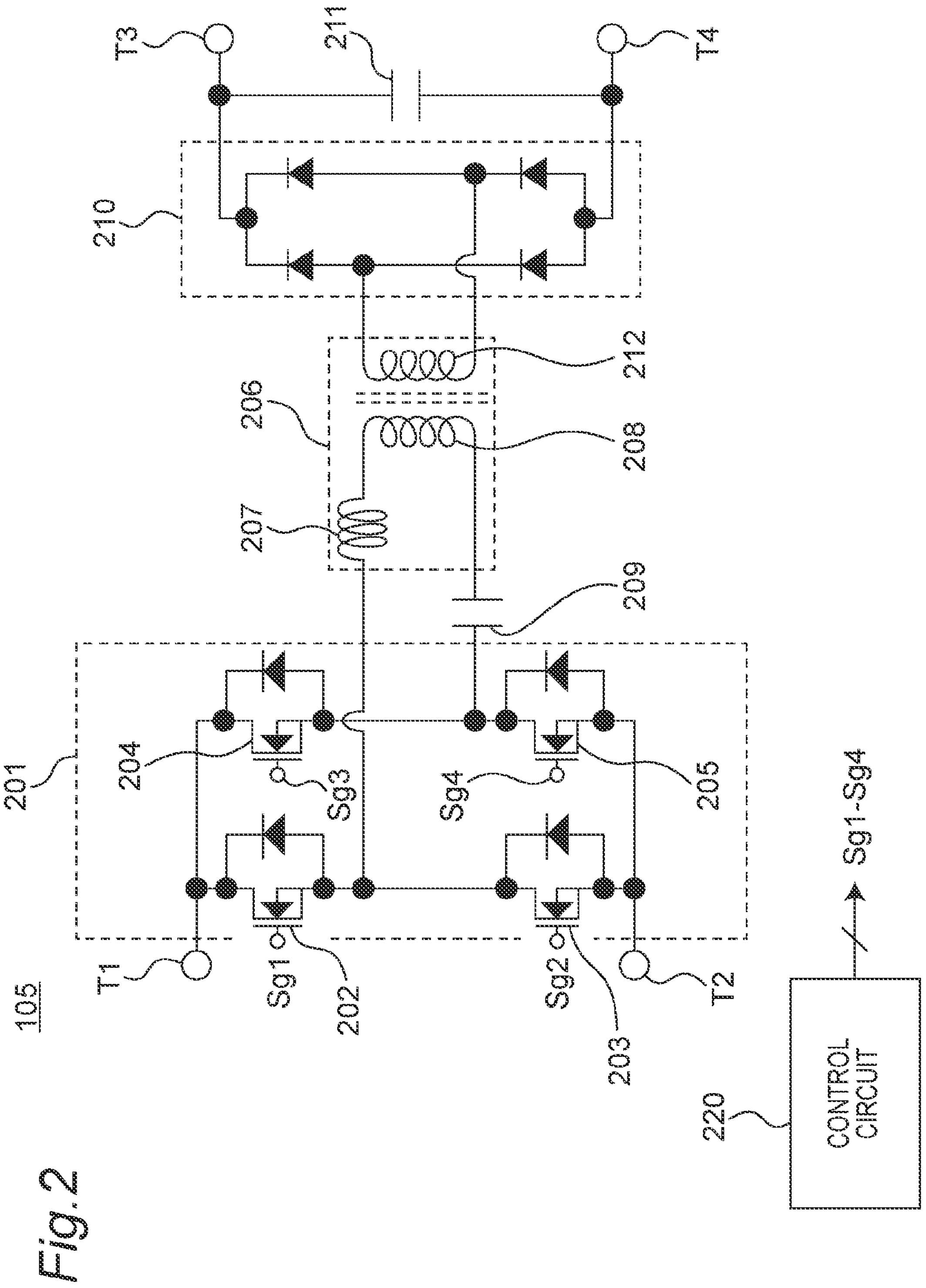
FIG. 2 is a circuit diagram illustrating an example of the configuration of an LLC resonance-type DC-DC converter 105 in FIG. 1.

FIG. 2 is a circuit diagram illustrating an example of the configuration of the DC-DC converter 105 in FIG. 1. In the embodiment, as one example, an LLC resonance-type DC-DC converter 105 is used as the DC-DC converter, that is widely used in a high efficiency power source such as an industrial switching power source, an on-board charger, or a power converter.

In FIG. 2, the LLC resonance-type DC-DC converter 105 includes input terminals T1 and T2, and output terminals T3 and T4. The LLC resonance-type DC-DC converter 105 includes, between the input terminals and the output terminals, an inverter circuit 201, a resonance capacitor 209, the transformer 206, a rectifying circuit 210, a smoothing capacitor 211, and a control circuit 220. The control circuit 220 generates gate signals Sg1 to Sg4 that control the operation of the inverter circuit 201. The inverter circuit 201 is configured by connecting switching elements such as N-channel MOS transistors 202 to 205 to each other in a bridge form. The inverter circuit 201 converts a DC voltage into an AC voltage by turning on or off the MOS transistors 202 to 205 in response to the gate signals Sg1 to Sg4. The transformer 206 includes a leakage inductance 207, an excitation inductance 208 of a primary coil, and an inductance 212 of a secondary coil.

Synchronized signals are input as the gate signal Sg1 and the gate signal Sg4. Similarly, synchronized signals are input as the gate signal Sg2 and the gate signal Sg3. Signals inverted against the gate signals Sg1 and Sg4 are input as the gate signals Sg2 and Sg3.

The MOS transistor 202 and the MOS transistor 205 are therefore turned on or off in synchronization with each other in response to the gate signal Sg1 and the gate signal Sg4. Similarly, the MOS transistors 203 and 204 are turned on or off in synchronization with each other in response to the gate signal Sg2 and the gate signal Sg3. The MOS transistors 202 and 205, and the MOS transistors 203 and 204 are controlled to be inverted against each other. When the MOS transistors 202 and 205 are turned on, at the same time, the MOS transistors 203 and 204 are turned off. When the MOS transistors 202 and 205 are turned off, at the same time, the MOS transistors 203 and 204 are turned on.

In the DC-DC converter 105, the inverter circuit 201 converts an input voltage into an AC voltage by switching, and outputs the AC voltage to the rectifying circuit 210 through the resonance capacitor 209 and the transformer 206. The output voltage is varied by utilizing the resonance of the two inductances and the one capacitor that include the leakage inductance 207 and the excitation inductance 208 of the transformer 206, and the resonance capacitor 209, and by using a frequency modulation scheme of varying the switching frequency for the four MOS transistors 202 to 205. Then, the output voltage from the transformer 206 is rectified by the rectifying circuit 210 and is smoothed by the smoothing capacitor 211, and a DC voltage after being rectified and smoothed is output.

By the DC-DC convertor 105 configured as above, the switching loss can be reduced by zero voltage switching, any surge current and any serge voltage can be reduced by the switching current that is close to a sinusoidal wave, and any noise can be reduced.

Figure 3:
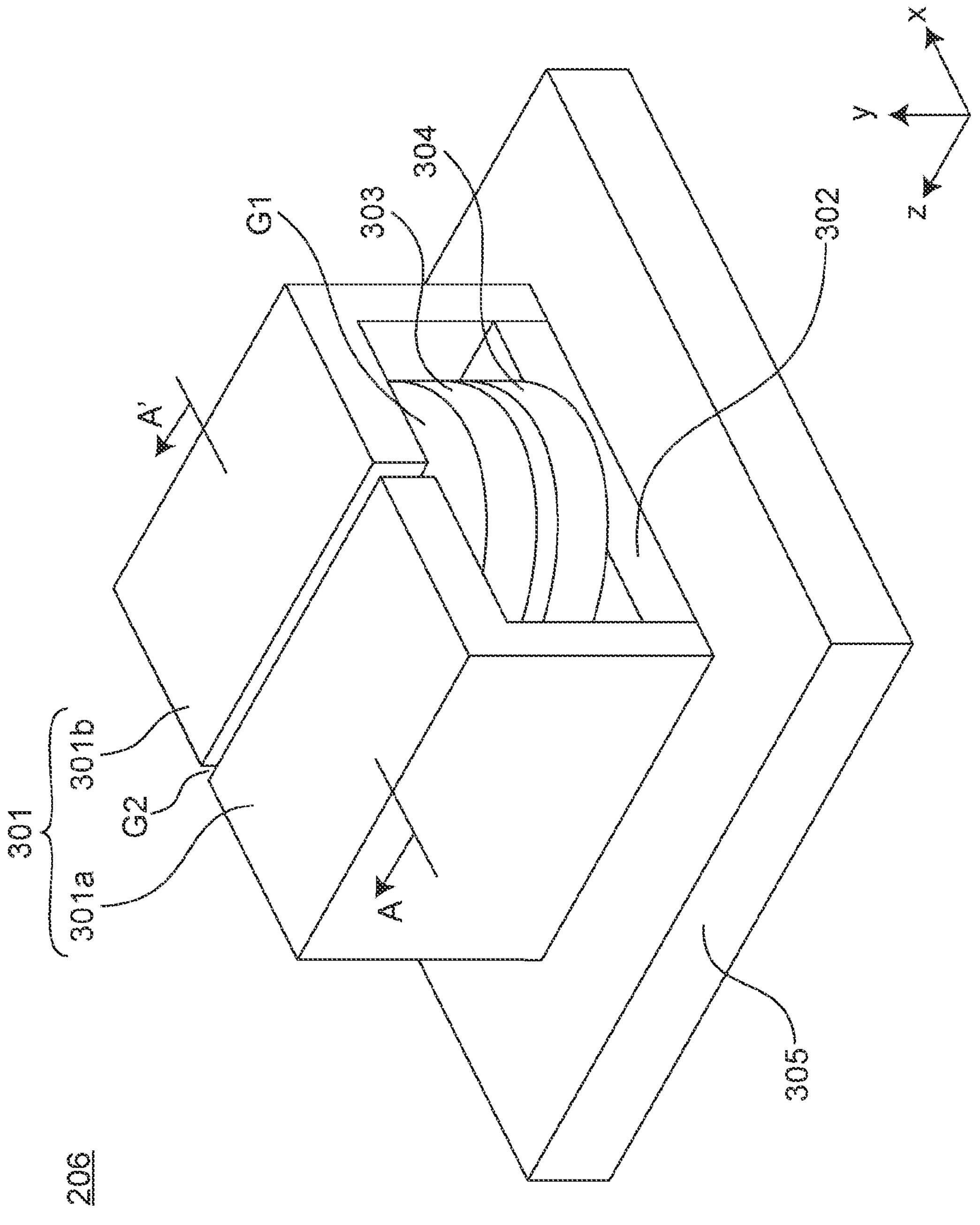
FIG. 3 is a perspective view illustrating an outer appearance of a transformer 206 in FIG. 2.
Figure 4:
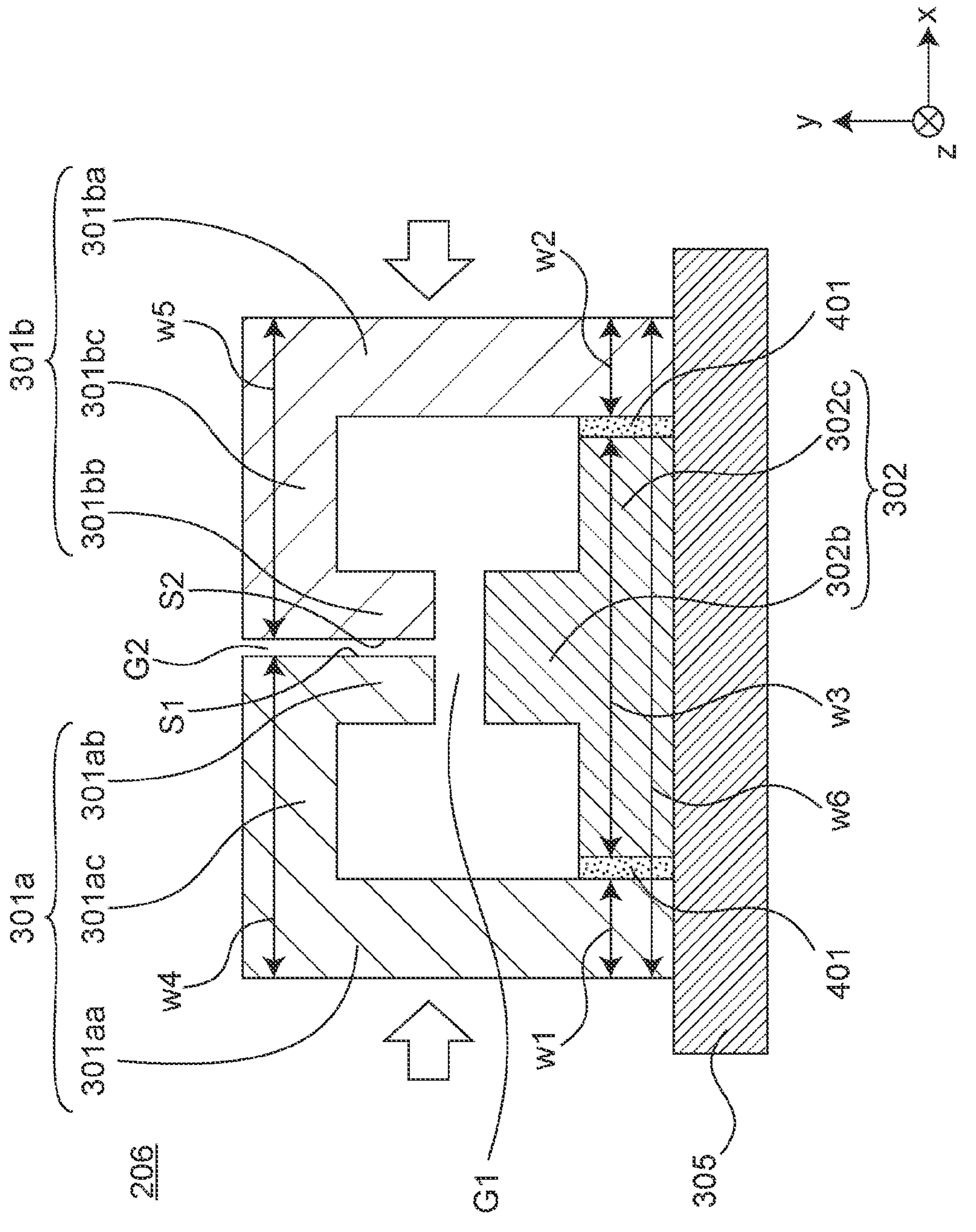
FIG. 4 illustrates a cross-section taken along a line A-A' in FIG. 3, and is a longitudinal cross-sectional diagram illustrating the connection direction of cores when the transformer 206 is fixed using an adhesive 401.

FIG. 3 is a perspective view illustrating an outer appearance of the transformer 206 in FIG. 2. FIG. 4 is a longitudinal cross-sectional diagram taken along a line A-A' in FIG. 3. As illustrated in FIG. 3, the transformer 206 after the manufacture thereof is mounted on an air-cooling type or a water-cooling type cooling device 305 that cools the transformer 206. The transformer 206 and the cooling device 305 constitute a transformer device. Hereinafter, the direction perpendicular to the central plane in which the cooling device 305 contacts the transformer 206 will be denoted by "y-axis direction", and the plane parallel to the central plane will be denoted by "xz-plane". In FIG. 4, a direction intersecting the y-axis direction at a right angle is denoted by "x-axis direction". A direction intersecting the xy-plane at a right angle is denoted by "z-axis direction". The description will therefore be made denoting the up-and-down direction in FIGS. 3 and 4 as "y-axis direction" and the right-and-left direction as "x-axis direction" while the above is not intended to limit the use form of the transformer 206.

In FIGS. 3 and 4, the transformer 206 includes a first core 301, a second core 302, a primary coil 303, and a secondary coil 304. In this embodiment, the first core 301 and the second core 302 are each configured by, for example, a ferrite core.

The first core 301 is divided into a first core part 301*a* and a second core part 301*b*. The first core 301 is divided by a predetermined division plane, and a first division surface S1 of the first core part 301*a* and a second division surface S2 of the second core part are thereby formed. Each of the first division surface S1 and the second division surface S2 is a plane parallel to the yz-plane. The first core part 301*a* includes an outer leg 301*aa*, an inner leg 301*ab*, and a first bottom face part 301*ac*. The second core part 301*b* includes an outer leg 301*ba*, an inner leg 301*bb*, and a first bottom face part 301*bc*.

In the longitudinal cross-sectional diagram in FIG. 4, each of the outer legs 301*aa* and 301*ba* is configured to extend in the y-axis direction. The first bottom face part 301*ac* is configured to extend from an upper side end of the outer leg 301*aa* in the x-axis direction, and the inner leg 301*ab* is configured to extend from a right side end of the first bottom face part 301*ac* in the −y-axis direction. The first bottom face part 301*bc* is configured to extend from an upper side end of the outer leg 301*ba* in the −x-axis direction, and the inner leg 301*bb* is configured to extend from a left side end of the first bottom face part 301*bc* in the −y-axis direction. The dimension in the y-axis direction of each of the inner legs 301*ab* and 301*bb* is configured to be shorter than the dimensions in the y-axis direction of the outer legs 301*aa* and 301*ba*.

The second core 302 includes an inner leg 302*b* and a bottom face part 302*c*. The inner leg 302*b* is configured to extend from the central part of the bottom face part 302*c* in the y-axis direction, the bottom face part 302*c* is configured to extend from a lower side end of the inner leg 302*b* in the x-axis direction and the −x-axis direction.

The first core part 301*a* of the first core 301, the second core part 301*b* of the first core 301, the second core 302, and the cooling device 305 are disposed as follows.

(1) A side face on the x-axis direction side of the outer leg 301*aa* of the first core part 301*a* and an end face (a side face on the −x-axis direction side) of the bottom face part 302*c* of the second core 302 are disposed to be bonded with each other using an adhesive.

(2) A side face on the −x-axis direction side of the outer leg 301*ba* of the second core part 301*b* and an end face on the side opposite to that of the end face bonded with the first core part 301*a* (a side face on the x-axis direction side) of the bottom face part 302*c* of the second core 302 are disposed to be bonded with each other using an adhesive.

(3) Each of end faces of the inner leg 301*ab* of the first core part 301*a* and of the inner leg 301*bb* of the second core part 301*b* (end faces on the −y-axis direction side) is disposed to face an end face of the inner leg 302*b* of the second core 302 (an end face on the y-axis direction side) through a predetermined gap G1.

(4) The first core part 301*a* and the second core part 301*b* of the first core 301 are disposed to face each other on the division surfaces S1 and S2 through a predetermined gap G2. That is, a side face on the x-axis direction side of the inner leg 301*ab* of the first core part 301*a* and a side face on the −x-axis direction side of the inner leg 301*bb* of the second core part 301*b* are disposed to face each other through the predetermined gap G2.

(5) An end face of the outer leg 301*aa* of the first core part 301*a* and the cooling device 305 are disposed to face each other.

(6) An end face of the outer leg 301*ba* of the second core part 301*b* and the cooling device 305 are disposed to face each other.

(7) The bottom face part 302*c* of the second core 302 and the cooling device 305 are disposed to face each other.

An end face of the outer leg 301*aa* of the first core part 301*a*, an end face of the outer leg 301*ba* of the second core part 301*b*, and a bottom face of the bottom face part 302*c* of the second core 302 are disposed on the cooling device 305 so as to contact the cooling device 305. As described later, the above configuration parts may contact each other through a filling materials, respectively.

As above, the inner legs 301*ab* and 301*bb* of the two core parts 301*a* and 301*b* of the first core 301, and the inner leg 302*b* of the second core 302 are disposed to face each other and away from each other having the gap G1 therebetween. The excitation inductance 208 of the transformer 206 can be adjusted by adjusting the interval of the gap G1. The value of the leakage inductance is also varied depending on the interval of the gap G1. The leakage inductance 207 is also adjusted by the distance between the primary coil 303 and the secondary coil 304.

At the end of the manufacture steps of the overall cores, filling is executed with a filling material including an insulating material such as, for example, a silicone filling material. At this time, the filling material may be filled in the gap G1, in the gap G2, between the end face of the outer leg 301*aa* of the first core part 301*a* and the cooling device 305, between the end face of the outer leg 301*ba* of the second core part 301*b* and the cooling device 305, between the bottom face part 302*c* of the second core 302 and the cooling device 305, or the like.

A bobbin, a bobbin cover that secures an insulation distance between lead wires or cores and coils, a mechanism to position the bobbin and the cores, and the like that are included in an ordinary transformer are not illustrated in the drawings while these elements may be added as necessary.

In the on-board charger 101, heat dissipation and cooling of the parts thereof are executed by disposing the cooling device 305 such as a water-cooling device or an air-cooling device. The cooling device 305 is disposed on the −y-axis direction side of the transformer 206 and dissipates the heat generated by the transformer 206.

Figure 5:
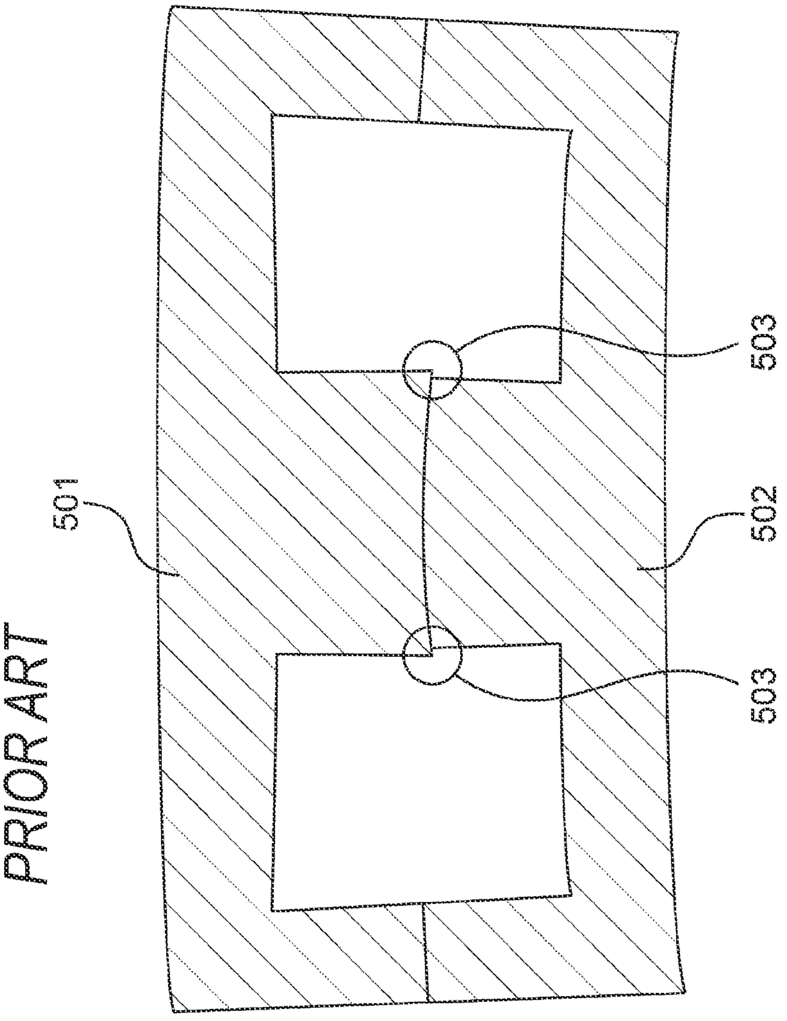
Fig.5 PRIOR ART
FIG. 5 is a longitudinal cross-sectional diagram illustrating an enlarged view of distortion generated in cores when a difference in the temperature occurs between cores of a transformer according to a prior art example.

FIG. 5 is a longitudinal cross-sectional diagram illustrating an enlarged view of distortion generated in a first core 501 and a second core 502 when a difference in the temperature occurs between the cores 501 and 502 of a transformer whose first core 501 is not divided into two, according to a conventional example.

As is clear from FIG. 5, it can be seen that the first core 501 deforms to be upwardly convex due to the heat expansion coefficient of the first core 501, and a stretching stress is outwardly applied to the first core 501. This can also be seen from the fact that the thickness of an inner leg of the first core 501 that has the same size as that of an inner leg of the second core 502 at the same temperature becomes larger than the thickness of the inner leg of the second core 502 as indicated by expansion parts 503. Core cracking may occur in the E-shaped cores of the conventional example when such stress is applied to the cores. The transformer device according to this embodiment is, however, configured for the first core part 301*a* and the second core part 301*b* to be disposed away from each other. The stress is therefore released and the core cracking may be reduced.

In the transformer device according to this embodiment, the end face of the outer leg 301*aa* of the first core part 301*a* and the end face of the outer leg 301*ba* of the second core part 301*b* are each mounted on the cooling device 305 and these end faces face the cooling device 305. The first core part 301*a* and the second core part 301*b* can therefore be directly cooled by the cooing device 305, and the difference in the temperature between the cores due to the distortion can therefore be reduced. Any core cracking can thereby be reduced.

In the embodiment, the cores are assembled as illustrated in FIG. 4 to have a desired leakage inductance as the transformer 206 of the LLC resonance-type DC-DC converter 105. In FIG. 4, the first core part 301*a* is pushed to the second core 302 in the x-axis direction to be bonded therewith. The side face on the x-axis direction side of the outer leg 301*aa* of the first core part 301*a* and the end face on the −x-axis direction side of the bottom face part 302*c* of the second core 302 are thereby bonded with each other using an adhesive 401. The second core part 301*b* is pushed to the second core 302 in the −x-axis direction to be bonded therewith using an adhesive 401. The side face on the −x-axis direction side of the outer leg 301*ba* of the second core part 301*b* and the end face on the x-axis direction side of the bottom face part 302*c* of the second core 302 are thereby bonded with each other. Arrows illustrated in FIG. 4 indicate that the first core part 301*a* is pushed in the x-axis direction to the second core 302, and the second core part 301*b* is pushed in the −x-axis direction to the second core 302.

Even when each of a dimension w1 in the x-axis direction of the outer leg 301*aa* of the first core part 301*a*, a dimension w2 in the x-axis direction of the outer leg 301*ba* of the second core part 301*b*, and a dimension w3 in the x-axis direction of the second core 302 has dispersion in the manufacture of the cores, the cores can be assembled without forming any gap in any of the bonded portions each bonded by the adhesive 401, by employing the above assembling method.

The transformer having a desired leakage inductance can thereby be manufactured without having any gap unintended in the design formed in the bonded portions thereof. At this time, taking into consideration the manufacture dispersion, the transformer is designed such that the dimension, which is a sum of a dimension w4 in the x-axis direction of the first core part 301*a* and a dimension w5 in the x-axis direction of the second core part 301*b*, is smaller than a dimension w6 in the x-axis direction of the cores after the assembly thereof. The design is therefore executed for w4, w5, and w6 to be w4+w5<w6.

As above, in the transformer 206 according to this embodiment, the first core 301 is divided into the first core part 301*a* and the second core part 301*b* to be away from each other, and the stress is thereby released and any core cracking can be reduced.

In the transformer 206 according to this embodiment, the end face of the outer leg 301*aa* of the first core part 301*a* and the end face of the outer leg 301*ba* of the second core part 301*b* are each mounted on the cooling device 305 and these end faces are disposed to face the cooling device 305. The first core part 301*a* and the second core part 301*b* can directly be cooled by the cooing device 305 by configuring as above, and the difference in the temperature between the cores due to the distortion can therefore be reduced. Any core cracking can thereby be reduced. Moreover, any temperature increase of each of the first core part 301*a* and the second core part 301*b* can be suppressed. Any core cracking can thereby be reduced.

In the transformer 206 according to this embodiment, as illustrated in FIG. 4, the first core part 301*a* is pushed to the second core 302 from the left direction to be bonded therewith, and the second core part 301*b* is pushed to the second core 302 from the right direction to be bonded therewith. Even when each of the dimension w1 in the x-axis direction of the outer leg 301*aa* of the first core part 301*a*, the dimension w2 in the x-axis direction of the outer leg 301*ba* of the second core part 301*b*, and the dimension w3 in the x-axis direction of the second core 302 has dispersion in the manufacture of the cores, the cores can be assembled without forming any gap in each of the bonded portions boded by the adhesive 401, by configuring as above. The transformer having a desired leakage inductance can thereby be manufactured without forming any gap unintended in the design in the bonded portions thereof.

Modification Example 1

Figure 6:
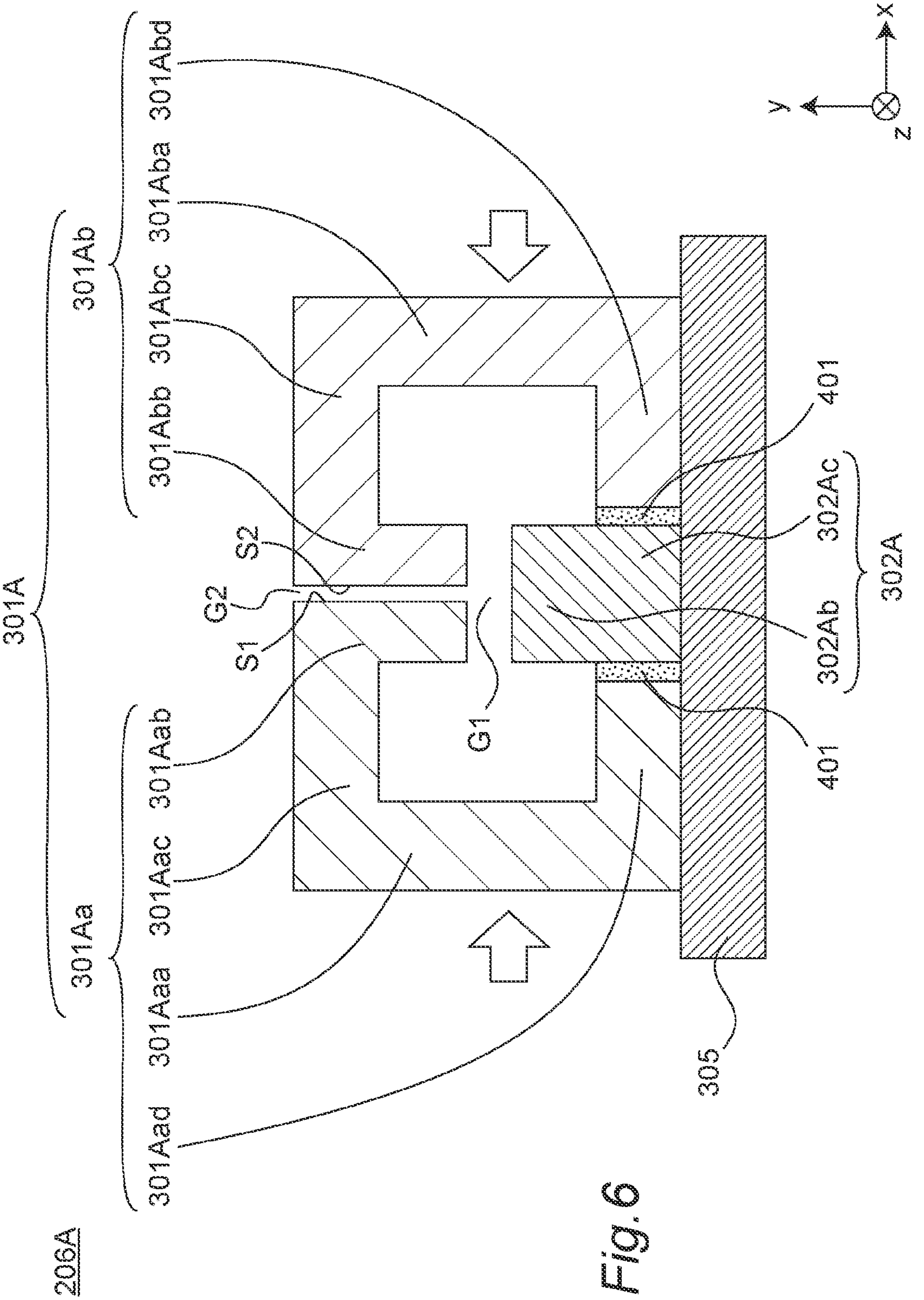
FIG. 6 is a longitudinal cross-sectional diagram illustrating an example of the configuration of a transformer 206A according to Modification Example 1 and a connection direction of cores thereof when the transformer 206A is fixed using the adhesive 401.

FIG. 6 is a longitudinal cross-sectional diagram illustrating an example of the configuration of a transformer 206A according to Modification Example 1. The transformer 206A includes a first core 301A and a second core 302A. The first core 301A includes a first core part 301Aa and a second core part 301Ab.

The first core part 301Aa includes an outer leg 301Aaa, an inner leg 301Aab, a first bottom face part 301Aac, and a second bottom face part 301Aad. The second bottom face part 301Aad of the first core part 301Aa is formed to extend in the x-axis direction from the lower side end of the outer leg 301Aaa of the first core part 301Aa.

The second core part 301Ab includes an outer leg 301Aba, an inner leg 301Abb, a first bottom face part 301Abc, and a second bottom face part 301Abd. The second bottom face part 301Abd of the second core part 301Ab is formed to extend in the −x-axis direction from the lower side end of the outer leg 301Aba of the second core part 301Ab.

The second core 302A includes an inner leg 302Ab and a bottom face part 302Ac. Unlike the bottom face part 302*c* of the second core 302 of the transformer 206, the bottom face part 302Ac does not extend in the x-axis direction and −x-axis direction from the lower side end of the inner leg 302Ab, and is formed together the inner leg 302Ab so that the second core 302A has a substantial rectangular cross-section.

The second bottom face part 301Aad of the first core part 301Aa is disposed facing the cooling device 305. The second bottom face part 301Abd of the second core part 301Ab is disposed facing the cooling device 305. The bottom face part 302Ac of the second core 302A is disposed facing the cooling device 305.

As above, in the transformer 206A according to Modification Example 1, the second bottom face part 301Aad of the first core part 301Aa and the second bottom face part 301Abd of the second core part 301Ab are each mounted on the cooling device 305 and these bottom faces are disposed to face the cooling device 305. The areas where the first core part 301Aa and the second core part 301Ab contact and face the cooling device 305 are increased by configuring as above, and the cooling property of each of the first core part 301Aa and the second core part 301Ab is therefore enhanced. The difference in the temperature between the cores due to the distortion can thereby be more reduced than that of the configuration of the transformer 206 illustrated in FIG. 4.

The second core 302A of the transformer 206A is configured to be a substantially cuboid. The second core 302A of the transformer 206A therefore has such a structure that is simpler than that of the second core 302 of the transformer 206 illustrated in FIG. 4 and can therefore be easily manufactured.

Modification Example 2

Figure 7:
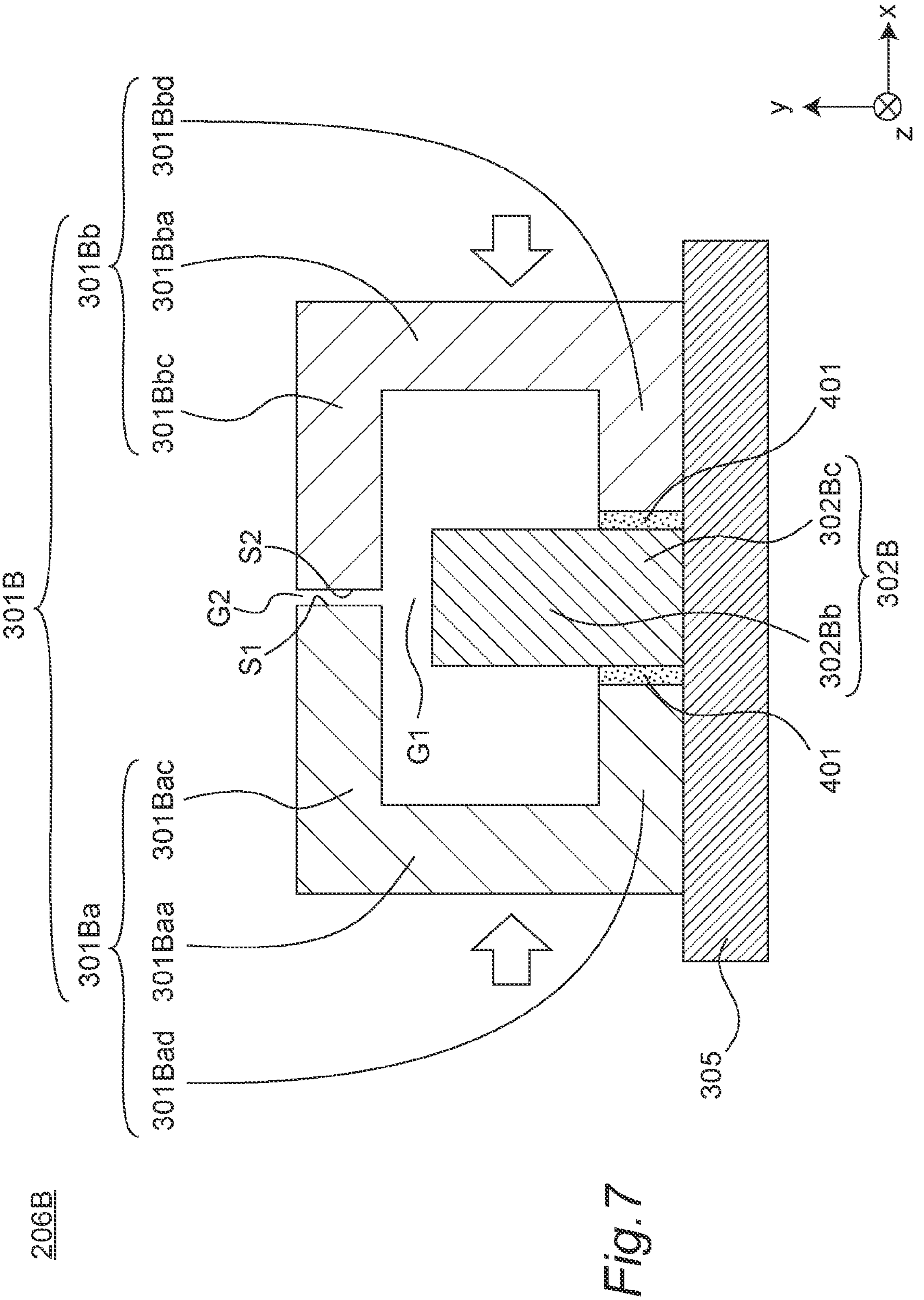
FIG. 7 is a longitudinal cross-sectional diagram illustrating an example of the configuration of a transformer 206B according to Modification Example 2 and a connection direction of cores thereof when the transformer 206B is fixed using the adhesive 401.

FIG. 7 is a longitudinal cross-sectional diagram illustrating an example of the configuration of a transformer 206B according to Modification Example 2. The transformer 206B includes a first core 301B and a second core 302B. The first core 301B includes a first core part 301Ba and a second core part 301Bb.

The first core part 301Ba includes an outer leg 301Baa, a first bottom face part 301Bac, and a second bottom face part 301Bad. The second core part 301Bb includes an outer leg 301Bba, a first bottom face part 301Bbc, and a second bottom face part 301Bbd. The second core 302B includes an inner leg 302Bb and a bottom face part 302Bc.

Unlike the first core part 301Aa of the transformer 206A, the first core part 301Ba of the transformer 206B has a structure having no inner leg disposed therein. Similarly, unlike the second core part 301Ab of the transformer 206A, the second core part 301Bb of the transformer 206B has a structure having no inner leg disposed therein. To acquire a desired excitation inductance 208 or a desired leakage inductance 207, the second core 302B adjusts the interval of the gap G1 by extending in the y-axis direction compared to the second core 302A.

The second bottom face part 301Bad of the first core part 301Ba is disposed facing the cooling device 305. The second bottom face part 301Bbd of the second core part 301Bb is disposed facing the cooling device 305. The bottom face part 302Bc of the second core 302B is disposed facing the cooling device 305.

In Modification Example 2 configured as above, the second bottom face part 301Bad of the first core part 301Ba and the second bottom face part 301Bbd of the second core part 301Bb are mounted on the cooling device 305 and these bottom faces are disposed to face the cooling device 305. The areas where the first core part 301Ba and the second core part 301Bb contact and face the cooling device 305 are increased by configuring as above, and the cooling property of each of the first core part 301Ba and the second core part 301Bb is therefore enhanced. The difference in the temperature between the cores due to the distortion can thereby be more reduced than that of the configuration of the transformer 206 illustrated in FIG. 4.

The first core part 301Ba of the transformer 206B has no part present therein that corresponds to the inner leg 301Aab of the first core part 301Aa of the transformer 206A illustrated in FIG. 6. Similarly, the second core part 301Bb of the transformer 206B has no part present therein that corresponds to the inner leg 301Abb of the second core part 301Ab of the transformer 206A illustrated in FIG. 6. The first core part 301Ba and the second core part 301Bb of the transformer 206B have therefore simpler structures than those of the first core part 301Aa and the second core part 301Ab of the transformer 206A illustrated in FIG. 6 and can easily be manufactured.

SUMMARY OF EMBODIMENTS

The transformer device according to this embodiment described above may be configured as below.

(Aspect 1) A transformer device includes a transformer and a cooling device that cools the transformer, in which the transformer includes a primary coil, a secondary coil, and a first core and a second core, into which the primary and secondary coils are respectively inserted, and the first and second cores are disposed to face each other, in which the first core includes a first core part and a second core part, each of the first and second core parts formed by dividing the first core in a predetermined division plane, in which the first and second core parts of the first core are disposed to face each other through a gap, and in which the first core and the cooling device are disposed to face each other.

According to Aspect 1, any stress occurring when temperature variation is generated in the first core can be reduced by the division of the first core, and any cracking can also be suppressed from occurring in the first core. The configuration can be established for the first core to be cooled by the cooling device. Any temperature variation of the first core can therefore be suppressed and occurrence of any cracking in the first core can be suppressed.

(Aspect 2) In the transformer device in Aspect 1, the second core and the cooling device may be disposed to face each other.

According to Aspect 2, the configuration can be established for the second core to be cooled by the cooling device. Any temperature variation of the second core can be suppressed and occurrence of any cracking in the second core can be suppressed.

(Aspect 3) In the transformer device in Aspect 1 or 2, the first core may be divided by the division plane to form a first division surface of the first core part and a second division surface of the second core part, and may be disposed for the first and second division surfaces to face each other.

According to Aspect 3, any stress occurring when any temperature variation is generated in the first core can be reduced and occurrence of any cracking in the first core can be suppressed.

(Aspect 4) In the transformer device in any one of Aspect 1 to Aspect 3, the first and second cores may be disposed to face each other through a gap.

According to Aspect 4, generation of any stress caused by a difference in the temperature between the first core and the second core can be prevented and occurrence of any cracking in each of the cores can be suppressed.

(Aspect 5) In the transformer device in any one of Aspect 1 to Aspect 4, the first core may be divided by the division plane in a horizontal direction into the first and second core parts, in which each of the first and second core parts may include an outer leg that extends in a vertical direction, on an outer side of the transformer device in the horizontal direction, each of in which the outer legs may be disposed for a bottom face of the outer leg to face the cooling device, and in which the first and second core parts may be bonded with the second core, so that the second core is sandwiched from outside in the horizontal direction by the first and second core parts.

According to Aspect 5, the first core part and the second core, and the second core part and the second core can each be bonded with each other therebetween. The dispersion of the size of the bonded portions of the cores can be reduced, and the transformer can easily be manufactured to have a desired leakage inductance.

(Aspect 6) In the transformer device in Aspect 5, each of the first and second core parts may further include a first bottom face part that extends from an upper part of the outer leg to a central side of the transformer device in the horizontal direction, and a first inner leg that extends from an end part of the bottom face part, on the central side of the transformer device in the horizontal direction, toward the second core in the vertical direction, in which the second core may include a second bottom face part that extends in the horizontal direction between the outer legs, and a second inner leg that extends from a central part of the second bottom face part toward the first inner leg in the vertical direction, and in which the second bottom face part may be disposed to face the cooling device.

According to Aspect 6, the transformer can be configured for all the first core part and the second core part thereof, and the second core thereof to face the cooling device. The cooling property for each of the cores can therefore be improved, any temperature variation of each of the cores can be suppressed, and occurrence of any cracking in each of the cores can be suppressed. The first core part and the second core, and the second core part and the second core can each be bonded with each other therebetween. The dispersion of the size of the bonded portions of the cores can therefore be reduced, and the transformer can easily be manufactured to have a desired leakage inductance.

(Aspect 7) In the transformer device in Aspect 5, each of the first and second core parts may further include a first bottom face part that extends from an upper part of the outer leg to a central side of the transformer device in the horizontal direction, a first inner leg that extends from an end part of the bottom face part, on the central side of the transformer device in the horizontal direction, toward the second core in the vertical direction, and a third bottom face part that extends from a lower part of the outer leg to the central side of the transformer device in the horizontal direction, in which the second core may further include a second inner leg that extends toward the first inner leg in the vertical direction, and in which a bottom face of the second inner leg and a bottom face of the third bottom face part may be disposed to each face the cooling device.

According to Aspect 7, the area cooled by the cooling device, of each of the first core part and the second core part is increased and the cooling property can therefore be improved. The cooling property for each of the cores can therefore be improved, any temperature variation of each of the cores can be suppressed, and occurrence of any cracking in each of the cores can be suppressed. The structure of the second core can be simplified, and the second core can more easily be manufactured.

(Aspect 8) In the transformer device in Aspect 5, each of the first and second core parts may further include a first bottom face part that extends from an upper part of the outer leg to a central side of the transformer device in the horizontal direction, and a third bottom face part that extends from a lower part of the outer leg to the central side of the transformer device in the horizontal direction, in which the second core may further include a second inner leg that extends toward an end part of the first bottom face part on the central side of the transformer device in the vertical direction, and in which a bottom face of the second inner leg and a bottom face of the third bottom face part may be disposed to each face the cooling device.

According to Aspect 8, the area cooled by the cooling device, of each of the first core part and the second core part is increased and the cooling property can therefore be improved. The cooling property for each of the cores can therefore be improved, any temperature variation of each of the cores can be suppressed, and occurrence of any cracking in each of the cores can be suppressed. The structures of the first core part and the second core part, and the second core can be simplified, and the first core part and the second core part, and the second core can more easily be manufactured.

(Aspect 9) In the transformer device in Aspect 6, the second bottom face part may contact the cooling device so that the cooling device cools the second core.

According to Aspect 9, the second core can directly be cooled by the cooling device. The cooling property for the second core can therefore be improved, any temperature variation of the second core can be suppressed, and occurrence of any cracking in the second core can be suppressed.

(Aspect 10) In the transformer device in Aspect 7 or 8, a bottom face of the second inner leg and bottom faces of the third bottom face parts may contact the cooling device so that the cooling device cools the first and second cores.

According to Aspect 10, the first core part and the second core part, and the second core can directly be cooled by the cooling device. The cooling property for each of the cores can therefore be improved, any temperature variation of each of the cores can be suppressed, and occurrence of any cracking in each of the cores can be suppressed.

(Aspect 11) In the transformer device in any one of Aspect 1 to Aspect 10, the first and second core parts, and the second core may be mounted on the cooling device to contact the cooling device so that the cooling device cools the first and second cores.

According to Aspect 11, the first core part and the second core part, and the second core can directly be cooled by the cooling device. The cooling property for each of the cores can therefore be improved, any temperature variation of each of the cores can be suppressed, and occurrence of any cracking in each of the cores can be suppressed.

(Aspect 12) A charger, which supplies a charging voltage to a rechargeable battery, according to the present disclosure includes the transformer device in any one of Aspect 1 to Aspect 11.

(Aspect 13) A power source device, which supplies a power source voltage to a load, according to the present disclosure includes the transformer device in any one of Aspect 1 to Aspect 11.

INDUSTRIAL APPLICABILITY

The transformers 206, 206A, and 206B according to the present disclosure are each usable for not only the DC-DC converter 105 of the charger 101 in FIG. 1 that supplies a charging voltage to the rechargeable battery 106 but also each of various types of power source device that each supply a predetermined power source voltage to a load.

The invention claimed is:

1. A transformer device comprising:
a transformer; and
a cooling device that cools the transformer;
wherein the transformer comprising:
a primary coil,
a secondary coil, and
first and second cores, into which the primary and secondary coils are respectively inserted, the first and second cores being disposed to face each other, and
wherein the first core comprises first and second core parts, each of the first and second core parts formed by dividing the first core in a predetermined division plane,
wherein the first and second core parts of the first core are disposed to face each other through a gap,
wherein the first core and the cooling device are disposed to face each other,
wherein the first core is divided by the division plane in a horizontal direction into the first and second core parts,
wherein the first core part comprises a first outer leg, and the second core part comprises a second outer leg,
wherein each of the first outer leg and the second outer leg extends in a vertical direction on a respective outer side of the transformer device in the horizontal direction,
wherein each of the first outer leg and the second outer leg is disposed so that a bottom face of a respective one of the first outer leg and the second outer leg faces the cooling device, and
wherein the first and second core parts are bonded with the second core, so that the second core is sandwiched from outside in the horizontal direction by the first and second core parts.

2. The transformer device as claimed in claim 1,
wherein the second core and the cooling device are disposed to face each other.

3. The transformer device as claimed in claim 1,
wherein the first core is divided by the division plane to form a first division surface of the first core part and a second division surface of the second core part, and is disposed for the first and second division surfaces to face each other.

4. The transformer device as claimed in claim 1,
wherein the first and second cores are disposed to face each other through a gap.

5. The transformer device as claimed in claim 1,
wherein each of the first and second core parts further comprises:

a first bottom face part that extends from an upper part of the respective one of the first outer leg and the second outer leg to a central side of the transformer device in the horizontal direction; and a first inner leg that extends from an end part of the first bottom face part, on the central side of the transformer device in the horizontal direction, toward the second core in the vertical direction, wherein the second core comprises:

a second bottom face part that extends in the horizontal direction between the outer legs the first outer leg and the second outer leg; and a second inner leg that extends from a central part of the second bottom face part toward the first inner leg in the vertical direction, and wherein the second bottom face part is disposed to face the cooling device.

6. The transformer device as claimed in claim 1, wherein each of the first and second core parts further comprises:

a first bottom face part that extends from an upper part of the outer leg the respective one of the first outer leg and the second outer leg to a central side of the transformer device in the horizontal direction;

a first inner leg that extends from an end part of the first bottom face part, on the central side of the transformer device in the horizontal direction, toward the second core in the vertical direction; and a third bottom face part that extends from a lower part of the respective one of the first outer leg and the second outer leg to the central side of the transformer device in the horizontal direction, wherein the second core further comprises a second inner leg that extends toward the first inner leg in the vertical direction, and wherein a bottom face of the second inner leg and a bottom face of the third bottom face part are disposed to face the cooling device.

7. The transformer device as claimed in claim 1, wherein each of the first and second core parts further comprises:

a first bottom face part that extends from an upper part of the respective one of the first outer leg and the second outer leg to a central side of the transformer device in the horizontal direction; and a third bottom face part that extends from a lower part of the respective one of the first outer leg and the second outer leg to the central side of the transformer device in the horizontal direction, wherein the second core further comprises a second inner leg that extends toward an end part of the first bottom face part on the central side of the transformer device in the vertical direction, and wherein a bottom face of the second inner leg and a bottom face of the third bottom face part are disposed to face the cooling device.

8. The transformer device as claimed in claim 5, wherein the second bottom face part contacts the cooling device so that the cooling device cools the second core.

9. The transformer device as claimed in claim 6, wherein a bottom face of the second inner leg and bottom faces of the third bottom face parts contact the cooling device so that the cooling device cools the first and second cores.

10. The transformer device as claimed in claim 1, wherein the first and second core parts, and the second core are mounted on the cooling device to contact the cooling device so that the cooling device cools the first and second cores.

11. A charger that supplies a charging voltage to a rechargeable battery, the charger comprising the transformer device of claim 1.

12. A power source device that supplies a power source voltage to a load, the power source device comprising the transformer device of claim 1.

* * * * *